United States Patent
Friend et al.

(10) Patent No.: US 9,251,587 B2
(45) Date of Patent: Feb. 2, 2016

(54) MOTION ESTIMATION UTILIZING RANGE DETECTION-ENHANCED VISUAL ODOMETRY

(71) Applicant: Caterpillar Inc., Peoria, IL (US)

(72) Inventors: Paul Russell Friend, Morton, IL (US); Qi Chen, Dunlap, IL (US); Hong Chang, Peoria, IL (US); Daniel Dale Morris, Pittsburgh, PA (US); Jodi Seaborn Graf, Seabrook, TX (US)

(73) Assignee: Caterpillar Inc., Peoria, IL (US)

( * ) Notice: Subject to any disclaimer, the term of this patent is extended or adjusted under 35 U.S.C. 154(b) by 301 days.

(21) Appl. No.: 13/857,670

(22) Filed: Apr. 5, 2013

(65) Prior Publication Data

US 2014/0300732 A1 Oct. 9, 2014

(51) Int. Cl.
*H04N 7/18* (2006.01)
*G06T 7/00* (2006.01)

(52) U.S. Cl.
CPC ........... *G06T 7/0042* (2013.01); *G06T 2200/04* (2013.01); *G06T 2207/10016* (2013.01); *G06T 2207/10028* (2013.01); *G06T 2207/30244* (2013.01); *G06T 2207/30252* (2013.01)

(58) Field of Classification Search
USPC ......................................................... 348/135
See application file for complete search history.

(56) References Cited

U.S. PATENT DOCUMENTS

| | | | |
|---|---|---|---|
| 5,957,984 A | 9/1999 | Rencken | |
| 7,145,478 B2 | 12/2006 | Goncalves et al. | |
| 7,162,338 B2 | 1/2007 | Goncalves et al. | |
| 7,860,301 B2 * | 12/2010 | Se et al. | 382/154 |
| 7,925,049 B2 | 4/2011 | Zhu et al. | |
| 8,139,109 B2 * | 3/2012 | Schmiedel et al. | 348/118 |
| 8,155,870 B2 * | 4/2012 | Madsen et al. | 701/468 |
| 8,174,568 B2 | 5/2012 | Samarasekera et al. | |
| 8,213,706 B2 * | 7/2012 | Krishnaswamy et al. | 382/154 |
| 8,238,612 B2 | 8/2012 | Susca et al. | |
| 8,676,498 B2 * | 3/2014 | Ma et al. | 701/426 |
| 8,761,439 B1 * | 6/2014 | Kumar et al. | 382/103 |

(Continued)

OTHER PUBLICATIONS

David Nistér et al., "Visual Odometry for Ground Vehicle Applications," *Journal of Field Robotics* 23(1), 3-20, (2006), © 2006 Wiley Periodicals, Inc.; Published online in Wiley Interscience (www.interscience.wiley.com).

(Continued)

*Primary Examiner* — Dave Czekaj
*Assistant Examiner* — Leron Beck
(74) *Attorney, Agent, or Firm* — Finnegan, Henderson, Farabow, Garrett & Dunner, LLP

(57) ABSTRACT

A motion determination system is disclosed. The system may receive a first and a second camera image from a camera, the first camera image received earlier than the second camera image. The system may identify corresponding features in the first and second camera images. The system may receive range data comprising at least one of a first and a second range data from a range detection unit, corresponding to the first and second camera images, respectively. The system may determine first positions and the second positions of the corresponding features using the first camera image and the second camera image. The first positions or the second positions may be determined by also using the range data. The system may determine a change in position of the machine based on differences between the first and second positions, and a VO-based velocity of the machine based on the determined change in position.

20 Claims, 10 Drawing Sheets

(56) References Cited

U.S. PATENT DOCUMENTS

| | | |
|---|---|---|
| 2003/0045816 A1* | 3/2003 | Foxlin .......................... 600/595 |
| 2007/0288141 A1 | 12/2007 | Bergen et al. |
| 2008/0089556 A1 | 4/2008 | Salgian et al. |
| 2009/0279741 A1* | 11/2009 | Susca et al. ................... 382/107 |
| 2010/0017128 A1* | 1/2010 | Zeng ............................. 701/301 |
| 2011/0169923 A1 | 7/2011 | Dellaert et al. |
| 2011/0264303 A1 | 10/2011 | Lenser et al. |
| 2011/0316980 A1 | 12/2011 | Dubbelman et al. |
| 2012/0106828 A1 | 5/2012 | Yoon et al. |
| 2012/0170815 A1* | 7/2012 | Au et al. ....................... 382/106 |
| 2012/0182392 A1 | 7/2012 | Kearns et al. |
| 2012/0185094 A1 | 7/2012 | Rosenstein et al. |
| 2013/0050024 A1* | 2/2013 | Barott et al. .................. 342/454 |

OTHER PUBLICATIONS

Paul J. Besl, et al., "A Method for Registration of 3-D Shapes," *IEEE Transactions on Pattern Analysis and Machine Intelligence*, vol. 14, No. 2, Feb. 1992; 239-256, © 1992 IEEE.

Nghia, Ho, "Finding Optimal Rotation and Translation Between Corresponding 3D Points," Last Update: Mar. 18 2013, http://nghiaho.com/?page_id=671 downloaded on Apr. 10, 2013, pp. 1-20.

David Scaramuzza et al., "Tutorial: Visual Odometry, Part I: The First 30 Years and Fundamentals," *IEEE Robotics & Automation Magazine*, Dec. 2011, pp. 80-92, © Digital Vision.

\* cited by examiner

| Category | Signal | Inertial Measurement Unit | | | Visual Odometry | | |
|---|---|---|---|---|---|---|---|
| | | Direct | 1st Derived | 2nd Derived | Direct | 1st Derived | Key Frame |
| Angular Position | Roll | M | I1 | | | | Relative |
| | Pitch | M | I1 | | | | Relative |
| | Heading | | I1 | | | | Relative |
| Angular Velocity | Roll Rate | M | | | M | | |
| | Pitch Rate | M | | | M | | |
| | Yaw Rate | M | | | M | | |
| Position | X | | | I2 | | I1 | Relative |
| | Y | | | I2 | | I1 | Relative |
| | Z | | | I2 | | I1 | Relative |
| Velocity | X | | I1 | | | | |
| | Y | | I1 | | | | |
| | Z | | I1 | | | | |
| Acceleration | X | M | | | | D1 | |
| | Y | M | | | | D1 | |
| | Z | M | | | | D1 | |

MOTION ESTIMATION UTILIZING RANGE DETECTION-ENHANCED VISUAL ODOMETRY

This invention was made with government support under Cooperative Agreement NNJ10HB32A awarded by NASA/Johnson Space Center. The government has certain rights in the invention.

TECHNICAL FIELD

The present disclosure relates generally to methods and systems for estimating motion and more particularly, to methods and systems of estimating motion by utilizing LIDAR-enhanced visual odometry.

BACKGROUND

Machines such as, for example, dozers, motor graders, wheel loaders, wheel tractor scrapers, and other types of heavy equipment are used to perform a variety of tasks at a worksite. Autonomously and semi-autonomously controlled machines are capable of operating with little or no human input by relying on information received from various machine systems. For example, based on machine movement input, terrain input, and/or machine operational input, a machine can be controlled to remotely and/or automatically complete a programmed task. By receiving appropriate feedback from each of the different machine systems during performance of the task, continuous adjustments to machine operation can be made that help to ensure precision and safety in completion of the task. In order to do so, however, the information provided by the different machine systems should be accurate and reliable. The velocity and change in position of the machine are a few of such parameters, for which accuracy may be important for control of the machine and its operation.

Some exemplary systems determine velocity and change in position based on vision systems, utilizing methods known as visual odometry. For example, an exemplary system that may be used to determine changes in position is disclosed in U.S. Pat. No. 8,238,612 to Krishnaswamy et al. that issued on Aug. 7, 2012 (the '612 patent). The system in the '612 patent utilizes two optical cameras (stereo image) to obtain images at two different times. Based on changes between the images from the two cameras at different times, the system determines the translational and rotational movement of a mobile machine on which the cameras are mounted. In another embodiment, the system in the '612 patent utilizes a Light Detection and Ranging (LIDAR) device to obtain a 3D image of a scene at two different times. Based on changes between the LIDAR-based images, the system determines the translational and rotational movement of a mobile machine on which the LIDAR device is mounted.

Although the system of the '612 patent may be useful for determining various motions of a mobile machine, in some situations, a system which utilizes a single camera is desirable. For example, in the interest of saving initial costs and maintenance costs, a machine may be outfitted with only a single camera. A single camera does not provide the stereo image that is required by the system of the '612 patent. Furthermore, the LIDAR-based system of the '612 patent is not suitable for uniform terrain.

The disclosed machine motion determination system is directed to overcoming one or more of the problems set forth above and/or other problems of the prior art.

SUMMARY

In one aspect, the present disclosure is directed to a motion determination system for determining motion of a machine. The system may include one or more memories storing instructions. The system may also include one or more processors that may be configured to execute the instructions to perform operations including, receiving a first camera image and a second camera image from a camera affixed to the machine. The first camera image may be received earlier in time than the second camera image. The processors may identify corresponding features in the first camera image and the second camera image. The processors may also receive range data, wherein the range data comprises at least one of a first range data and a second range data from a range detection unit affixed to the machine. The first range data and the second range data may correspond to the first camera image and the second camera image, respectively. The processors may further determine first positions of the corresponding features using the first camera image and second positions of the corresponding features using the second camera image. The first positions or the second positions may be determined by also using the range data. The processors may determine a change in position of the machine based on differences between the first positions and the second positions. The processor may further determine a VO-based velocity of the machine based on the determined change in position of the machine.

In another aspect, the present disclosure is directed to a computer-implemented method for determining motion of a machine. The method may include receiving, by one or more computer processors, a first camera image and a second camera image from a camera affixed to the machine. The first camera image may be received earlier in time than the second camera image. The method may also include identifying, by the one or more computer processors, corresponding features in the first camera image and the second camera image. The method may further include receiving, by the one or more computer processors, range data, wherein the range data comprises at least one of a first range data and a second range data from a range detection unit affixed to the machine. The first range data and the second range data may correspond to the first camera image and the second camera image, respectively. The method may include determining first positions of the corresponding features using the first camera image. The method may also include determining second positions of the corresponding features using the second camera image. The first positions or the second positions may be determined by also using the range data. The method may further include determining, by the one or more computer processors, a change in position of the machine based on differences between the first positions and the second positions. The method may also include determining, by the one or more computer processors, a VO-based velocity of the machine based on the determined change in position of the machine.

In yet another aspect, the present disclosure is directed to a machine, comprising a camera affixed to the machine, a range detection unit affixed to the machine, and a controller in communication with the camera and the range detection unit. The controller may be configured to receive a first camera image and a second camera image from the camera. The first camera image may be received earlier in time than the second camera image. The controller may identify corresponding features in the first camera image and the second camera image. The controller may also receive range data, wherein the range data comprises at least one of a first range data and a second range data from the range detection unit. The first range data and the second range data may correspond to the first camera image and the second camera image, respectively. The controller may determine first positions of the corresponding features using the first camera image. The controller may also determine second positions of the corresponding features using the second camera image. The first positions or the second positions may be determined by also using the range data. The controller may determine a change in position of the machine based on differences in the first positions and second positions. Furthermore, the controller may determine a VO-based velocity of the machine based on the determined change in position of the machine.

BRIEF DESCRIPTION OF THE DRAWINGS

FIG. 9 is a chart illustrating an aspect of an exemplary disclosed method; and

DETAILED DESCRIPTION

Figure 1:
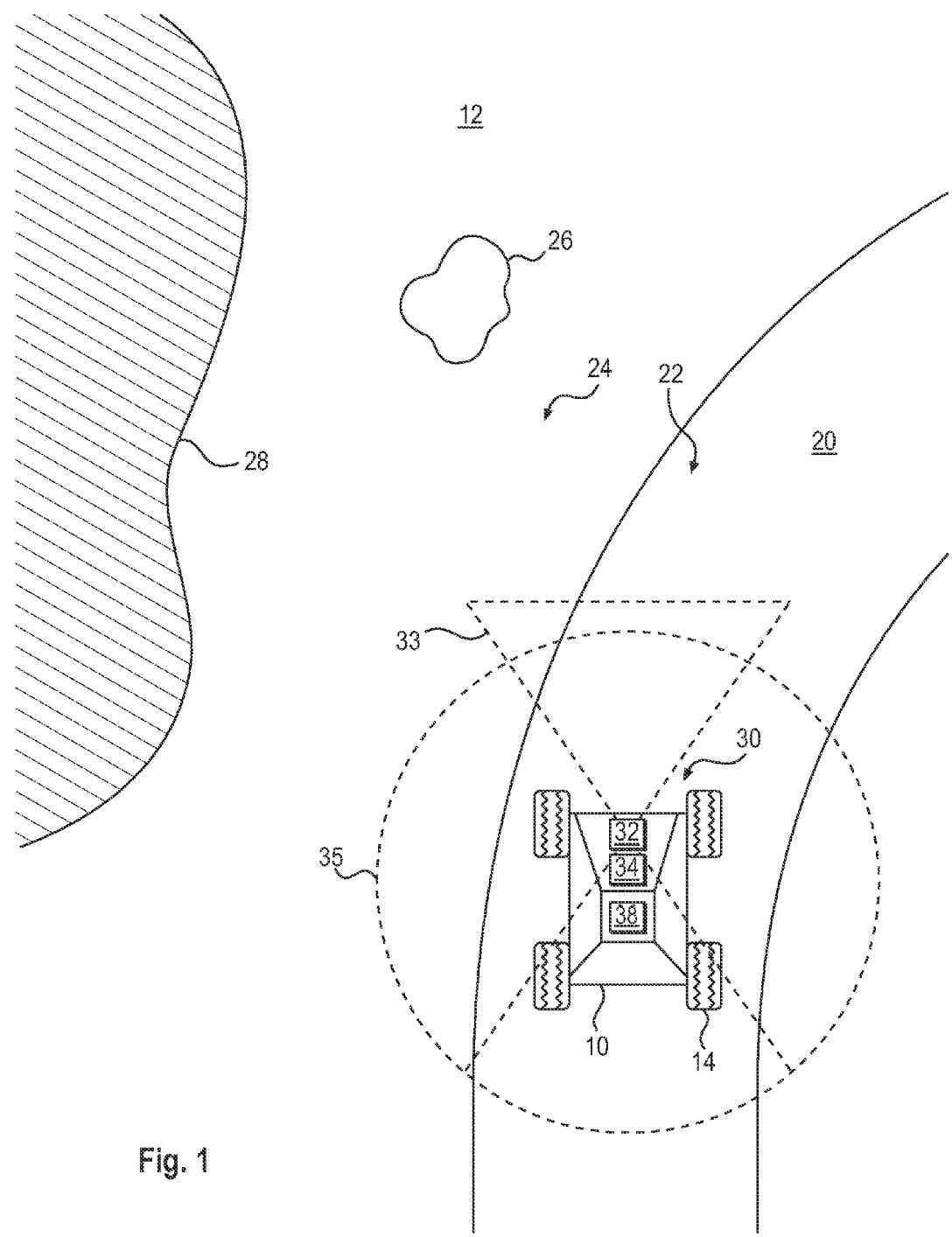
FIG. 1 is a pictorial illustration of an exemplary disclosed work machine on a worksite having an exemplary motion determination system.

FIG. 1 illustrates an exemplary machine 10. Machine 10 may be a mobile machine that performs one or more operations associated with an industry, such as mining, construction, farming, transportation, or any other industry, at a worksite 12. For example, machine 10 may be a load-moving machine, such as a haul truck, a loader, an excavator, or a scraper. Machine 10 may be manually controlled, semi-autonomously controlled, or fully-autonomously controlled. Machine 10 may generally include a power source (not shown), at least one traction device 14, and a motion determination system 30 for determining motion of machine 10. The power source may be connected to fraction device 14, e.g., by a drivetrain, thereby driving traction device 14 to propel machine 10 within worksite 12. Traction device 14 may include wheels located on each side of machine 10. Alternatively, traction device 14 may include tracks, belts, or other known fraction devices.

Worksite 12 may be a mine site or any other type of worksite traversable by machine 10. In some embodiments, worksite 12 may include various features. Features may be any characteristic, quality, and/or object of worksite 12. Exemplary features of worksite 12 may be a road 20, a dirt-covered portion 22 of the ground, a gravel-covered portion 24 of the ground, rocks 26, sidewalls 28 of worksite 12, and any other objects such as work signs, poles, dirt mounds, trees, and/or other machines, etc. or portions of such. Features may have various colors and/or shapes. In some situations, the ground of worksite 12 may be relatively flat. In other situations, the ground of worksite 12 may include variations in the contour of the ground and/or objects that protrude from the surface of the ground, such as rocks 26 or any other objects.

Motion determination system 30 may include a camera 32, a LIDAR unit 34, and an inertial measurement unit (IMU) 38. Camera 32 may be affixed to machine 10, for example, by being mounted to a body frame of machine 10. Camera 32 may take optical images of worksite 12 at successive time points. In some embodiments, camera 32 has a field of view 33 that determines the content of the images. Field of view 33 may be based on the view-angle of a lens of camera 32 and the orientation of camera 32 as mounted on machine 10. As machine 10 moves about worksite 12, the portion of worksite 12 within field of view 33 that is captured as a camera image changes. Based on the changes in successive images due to the movement of machine 10, motion determination system 30 may determine the movement of machine 10.

In one example, camera 32 may capture an image of a scene within field of view 33. At a successive moment in time, camera 32 may capture a new image in field of view 33 after machine 10 has moved forward a certain distance in that time, for example. Motion determination system 30 may identify features of worksite 12 captured in the two images that are common to both. Based on how much these features shift from the first image to the second image, motion determination system 30 may identify various rates of motion (e.g., linear velocities in the x-, y-, and z-axis directions, and angular velocities in the yaw, roll, and pitch directions). For example, motion determination system 30 may identify the boundary edge between dirt-covered portion 22 and gravel-covered portion 24 based on the different colors of the pixels in the captured images. Motion determination system 30 may utilize this boundary edge as a feature, which shifts in position in a first image and a second image. Based on the shift and the time elapsed during the shift, motion determination system 30 may estimate a velocity of machine 10.

In various embodiments, in order to determine the motion of machine 10 based on changes between the first and second image, motion determination system 30 may make an assumption that the ground over which machine 10 is traversing is flat. With this assumption, motion determination system 30 may be able assume a relationship between the position of a feature in the camera image and the distance from the actual feature to camera 32/machine 10. However, in situations in which the ground of worksite 12 is not flat, e.g., due to variations in contours of the ground or objects protruding from the ground, this relationship may not hold true. Because images from camera 32 contain no depth information, changes in the field of view 33 due to various contour changes and/or objects may not be accounted for appropriately. Motion determination system 30 may therefore be unable to accurately identify the change in distance from the actual feature to camera 32/machine 10 based solely on the images captured by camera 32.

In various embodiments, motion determination system 30 may include LIDAR unit 34 to obtain the depth information, which is referred to as range data. In other embodiments, motion determination system 30 may include devices other than LIDAR unit 34 to provide range information, such as a sonar device and/or radar device. LIDAR unit 34 may include a plurality of light sources, such as lasers. Each laser may generate a laser beam which is directed at various points of worksite 12. LIDAR unit 34 may further include one or more detector devices that receive the laser beams after reflection off of various points of worksite 12. Based on the time between generating the laser beam and receiving the reflected laser beam (referred to as time-of-flight measurements), motion determination system 30 may determine a distance to the corresponding point. In such a manner, motion determination system 30 may generate a point cloud image representative of a part of worksite 12 that is detected by LIDAR unit 34. Each data point in this LIDAR image may include a distance from the LIDAR unit 34 to a detected point of worksite 12. This LIDAR image is in contrast with an optical camera image, in which each data point generally represents a color of the detected point. In an exemplary embodiment, LIDAR unit 34 may include 64 lasers, which may collectively obtain approximately one million points per image. In other embodiments, LIDAR unit 34 may include more or less than 64 lasers and/or obtain more or less points per image. In some embodiments, LIDAR unit 34 may generate a point cloud image that captures a full 360 degrees surrounding of machine 10. In other embodiments, LIDAR unit 34 may capture 270 degrees of the surroundings of machine 10 (as shown in FIG. 1, as field of view 35), or any other amount of the surroundings.

LIDAR unit 34 may generate a first range image corresponding to a first image of camera 32 at one moment in time, and a second range image corresponding to a second image of camera 32 at a successive moment in time. Motion determination system 30 may combine the corresponding images from camera 32 and LIDAR unit 34. Based on the combination of information from these images, motion determination system 30 may determine the motion of machine 10. Due to the availability of the range information obtained by LIDAR unit 34, motion determination system 30 may be capable of determining motion even when the ground of worksite 12 is not flat or includes various protruding objects. As a result, motion determination system 30 may successfully depend on using only one camera 32. In some other embodiments, however, motion determination system 30 may utilize more than one camera 32. Various methods by which motion determination system 30 determines the motion of machine 10 based on the combination of information from camera 32 and LIDAR unit 34 are discussed in further detail below.

Motion determination system 30 may also utilize IMU 38. IMU 38 may include one or more devices that provide measurements of angular position, rates, and/or acceleration. For example, IMU 38 may include a 6-degree of freedom IMU, which includes a 3-axis accelerometer, a 3-axis angular rate gyroscope, and/or a 2-axis inclinometer. The 3-axis accelerometer may provide signals indicative of the acceleration of machine 10 in an x-, y-, and z-axis direction. The 3-axis angular rate gyroscope may provide signals indicative of the pitch rate, yaw rate, and roll rate of machine 10. The 2-axis inclinometer may provide the pitch angle and the roll angle, for example. Measurements from IMU 38 may include a bias offset or a bias drift. Bias offset is a constant error offset component in the measurement. Bias drift is a dynamic error offset component in the measurement. In addition, data that is generated from integrating measurements from IMU 38 may include a random walk error due to noise. That is, each measurement may include some error due to noise, which is then compounded by the integration of measurements. Such error may be unbounded. In various embodiments, the bias offset, bias drift, and/or noise model of IMU 38 may be known, either by conducting device characterization measurements or by referring to the device specifications data.

Figure 2:
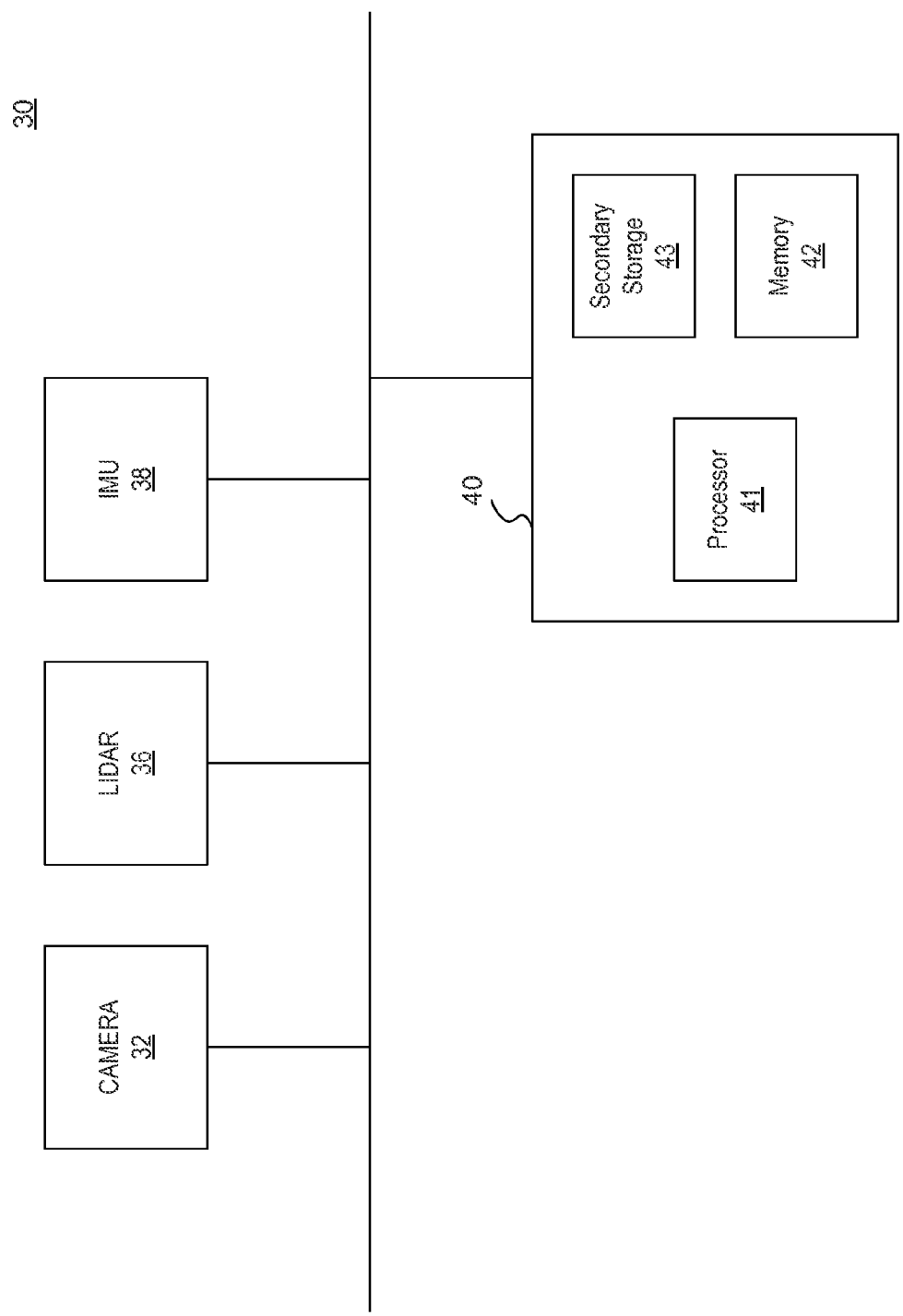
FIG. 2 is a diagrammatic illustration of the exemplary motion determination system of FIG. 1.

FIG. 2 illustrates an exemplary embodiment of motion determination system 30. As discussed, motion determination system 30 may include camera 32, LIDAR unit 34, and IMU 38. Motion determination system may further include a controller 40. Components of motion determination system 30 may be connected to each other via any combination of a bus, a wired network, and/or a wireless network. Additionally, such networks may be integrated into any local area network, wide area network, and/or the Internet. Controller 40 may include a processor 41, a memory 42, and a secondary storage 43, and any other components for running an application. Processor 41 may include one or more known processing devices, such as a microprocessor. Memory 42 may include one or more storage devices configured to store information used by controller 40 to perform certain functions related to disclosed embodiments. Secondary storage 43 may store programs and/or other information, such as information related to processing data received from one or more components of motion determination system 30, as discussed in greater detail below. Controller 40 may be in communication with sensors including camera 32, LIDAR 34, and/or IMU 38. When processor 41 executes programs stored in secondary storage 43 and loaded into memory 42, controller 40 may process signals received from camera 32, LIDAR 34, and/or IMU 38 and determine the motion of machine 10 based on the processed signals.

In some embodiments, controller 40 may combine various inputs from camera 32, LIDAR 34, and/or IMU 38 to determine the motion of machine 10. By combining the various inputs, motion determination system 30 may provide a more accurate and/or more robust determination of the motion of machine 10 compared to relying on only one of the inputs. In some situations, a more accurate and/or robust determination of the motion of machine 10 may allow for more accurate positioning of machine 10. Furthermore, in some embodiments, because such determinations are more accurate and/or robust, machine 10 may be able to determine its position within worksite 12 for longer periods of time without relying on an absolute position measurement device, such as a Global Positioning System (GPS) device. Various exemplary methods by which controller 40 combines the inputs are described in further detail below.

In some exemplary embodiments, controller 40 may utilize a Kalman filter to combine derived measurements with direct measurements to determine the motion of machine 10. A Kalman filter is a mathematical method that may be used to determine accurate values of measurements observed over time, such as measurements taken in a time series. There are many Kalman filters that may be used to perform this combining, including, for example, simple Kalman filter, Kalman-Bucy filter, extended Kalman filter, and/or square-root Kalman filter. Generally common to all Kalman filters is a propagation phase and a measurement update phase. In the propagation phase, derived measurements may be utilized to obtain estimates of motion or position. For example, the Kalman filter may integrate linear and angular rates to estimate the position (location and/or angular orientation) of machine 10. In addition, the Kalman filter may provide estimated uncertainties corresponding to the estimated position. With iterations of the estimation step of the Kalman filter, the estimated uncertainties may grow and be unbounded. In the measurement update phase, direct measurements from camera 32, LIDAR unit 34, and/or IMU 38 are utilized to update the estimated position from the propagation phase. With the update phase, the estimated uncertainties of a final determination are bounded to the measurement error.

FIGS. 3-9 depict flowcharts and diagrams depicting exemplary methods for determining the motion of machine 10 according to various disclosed embodiments. FIGS. 3-9 will be discussed in the following section to further illustrate the disclosed motion determination system and its operation.

INDUSTRIAL APPLICABILITY

The disclosed motion determination system 30 may be applicable to any machine, such as machine 10, for which motion determination is desired. The disclosed motion determination system 30 may provide for this need through the use of methods described herein, which may be performed by controller 40, for example. Operation of motion determination system 30 will now be explained with respect the FIGS. 3-9.

Figure 3:
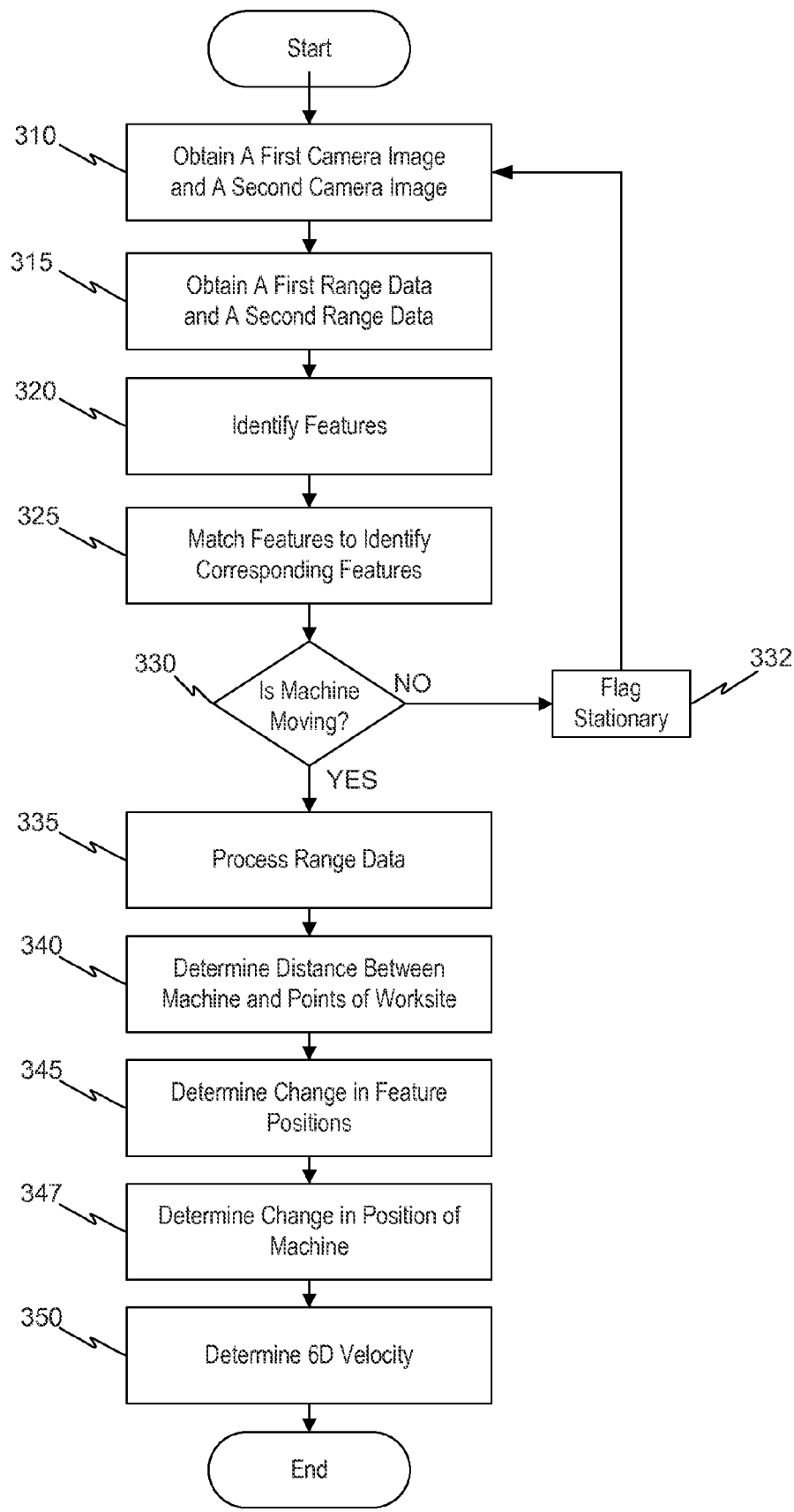
FIG. 3 is a flowchart depicting an exemplary disclosed method that may be performed by the motion determination system of FIG. 2.

FIG. 3 depicts a flowchart showing an exemplary method for combining inputs from camera 32 and a range detection unit, such as LIDAR unit 34, to determine the motion of machine 10. At Step 310, motion determination system 30 may obtain a first camera image and a second camera image of worksite 12 from camera 32. The first camera image and second camera image may be obtained at successive points in time. For example, the first camera image may be obtained at an earlier time than the second camera image. During the time that elapses between when the first camera image is taken and when the second camera image is taken, machine 10 may be moving. Therefore, the first camera image and the second camera image may differ according to the motion of machine 10.

At Step 315, motion determination system 30 may obtain a first range data and a second range data from LIDAR unit 34. The first range data may correspond to the first camera image, and the second range data may correspond to the second camera image. That is, the first range data may be obtained at the same time that the first camera image is obtained, and the second range data may be obtained at the same time as the second camera image.

At Step 320, motion determination system 30 may identify features in images obtained from camera 32. These features may be detected based on various predetermined discriminators that include, for example, color, brightness, or other characteristics of the images. At Step 325, motion determination system 30 may identify features in the first camera image that correspond to features in the second camera image. In one example, for a given pixel or group of pixels in a first camera image, motion determination system 30 may determine attribute values, such as color or brightness, of neighboring pixels. Motion determination system 30 may then identify a pixel or group of pixels in the second camera image with a set of neighboring pixels that match or correspond to those determined for the first camera image. Based on this identification, motion determination system 30 may determine that the pixel or group of pixels in the first camera image and in the second camera image include corresponding features. In various other embodiments, motion determination system 30 may perform other methods of identifying features and matching features between the first camera image and the second camera image, as known in the art.

At Step 330, motion determination system 30 may determine whether machine 10 is moving. For example, if machine 10 moves during the time between when camera 32 captures the first camera image and the second camera image, such corresponding features may shift within the frame of one image and the frame of the other. In some embodiments, if such corresponding features have not shifted location from the first camera image to the second camera image, motion determination system 30 may determine that machine 10 is, at least momentarily, stationary (Step 330: NO). Motion determination system 30 may flag that machine 10 is stationary to other control components associated with machine 10 (Step 332). In various embodiments, motion determination system 30 may then continue back to Step 310. If the corresponding features between the first camera image and the second camera image have shifted location, motion determination system 30 may determine that machine 10 is in motion (Step 330: YES) and continue to Step 335.

At Step 335, motion determination system 30 may process the range data to generate a range image. Motion determination system 30 may determine which portion of the range data overlaps with the camera image, and generate the range image accordingly. A range image may be an image with pixels corresponding to the pixels in the camera images. Each pixel of the range image may represent a distance to the part of worksite 12 that is represented by the corresponding pixel in the camera image. In some embodiments, the distance may be a distance from camera 32. In order to generate this distance from camera 32, motion determination system 30 may transform the LIDAR range data by utilizing information about where LIDAR unit 34 is affixed to machine 10 relative to camera 32.

At Step 340, motion determination system 30 may determine the distance from camera 32/machine 10 to the various points of worksite 12, identified in the camera images, by utilizing the corresponding range data. For example, motion determination system 30 may utilize information from both the first camera image and the first range image to determine first positions of various features of worksite 12 identified in the first camera image. Motion determination system 30 may also utilize information from the second camera image and the second range image to determine second positions of various features of worksite 12 identified in the second camera image.

Figure 4A:
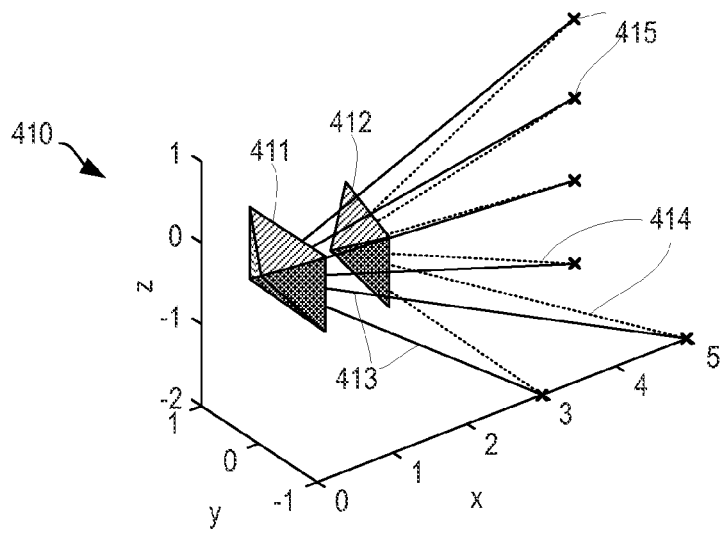
FIGS. 4A, 4B, and 4C are graphical illustration of exemplary disclosed methods that may be performed by the motion determination system of FIG. 2.

At Step 345, motion determination system 30 may determine the change between the first positions and the second positions of the features of worksite 12 relative to camera 32/machine 10. For example, graph 410 in FIG. 4A illustrates a representation of camera 32/machine 10 at a position 411 when motion determination system 30 obtains a first camera image. Graph 410 also illustrates a representation of camera 32/machine 10 at a position 412 when motion determination system 30 obtains a second camera image. Position 412 may be translated and rotated compared to position 411. For example, in graph 410, position 412 is translated in the positive x-direction and rotated clockwise around a z-axis as compared to position 411. First range data corresponding to the first camera image, obtained via LIDAR unit 34, is represented by lines 413. The first range data includes information about the first positions of various features 415 in worksite 10, captured in the first camera image, wherein the first positions are relative to position 411 of camera 32/machine 10. Second range data corresponding to the second camera image is represented by lines 414. The second range data includes information about second positions of features 415, also captured in the second camera image, wherein the second positions are relative to position 412 of camera 32/machine 10. Motion determination system 30 may determine the change between the distance and direction of lines 413 and lines 414 to determine the change between the first positions and the second positions of features 415.

Motion determination system 30 may associate these changes with angular rotations and linear translations that machine 10 undergoes. At Step 347, motion determination system 30 may determine changes in rotational and/or translational positions of machine 10 based on the changes in position of the features. In some embodiments, before determining the rotations and translations of machine 10, motion determination system 30 may remove outliers from the set of corresponding features obtained from the first and second camera images. Outliers may be features that do not appear to be consistent with the rest of the corresponding features. For example, the change in the location of the outlier feature from the first camera image to the second camera image may require a different combination of rotations and translation than the other features. In some embodiments, motion determination system 30 may additionally take into account information regarding camera intrinsic parameters, such as applying a lens calibration that takes the camera focal length into account, to determine the correct rotations and translations.

Motion determination system 30 may determine the rotations and translations of machine 10 by utilizing various mathematical methods. A simple example involves finding a center of mass of the positions of corresponding features obtained from first camera image/first range image and a center of mass of the positions of corresponding features obtained from the second camera image/second range image. One of the sets of corresponding features may be rigidly translated such that its center of mass lies on top of the other. This translation may correspond to the translation of machine 10 along x-, y-, and z-axes in worksite 12. One of the set of corresponding features may then be rigidly rotated such that the distances from features in the first camera image/first range image to features in the second camera image/second range image are minimized. This rotation may correspond to the rotation of machine 10 along the yaw, roll, and pitch directions. Other methods for determining the translations and rotations of machine 10 may be utilized. Some of these methods may take into account affine transformations, which include scaling and sheering parameters.

Figure 4B:
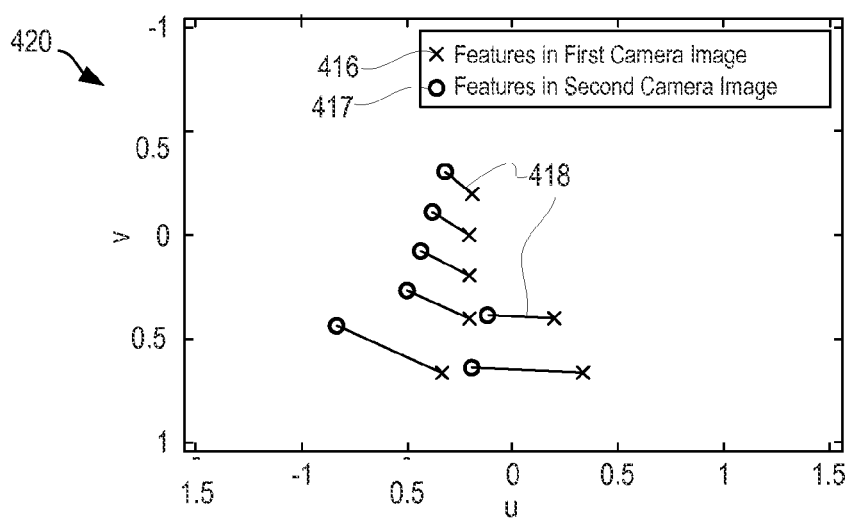
Figure 4C:
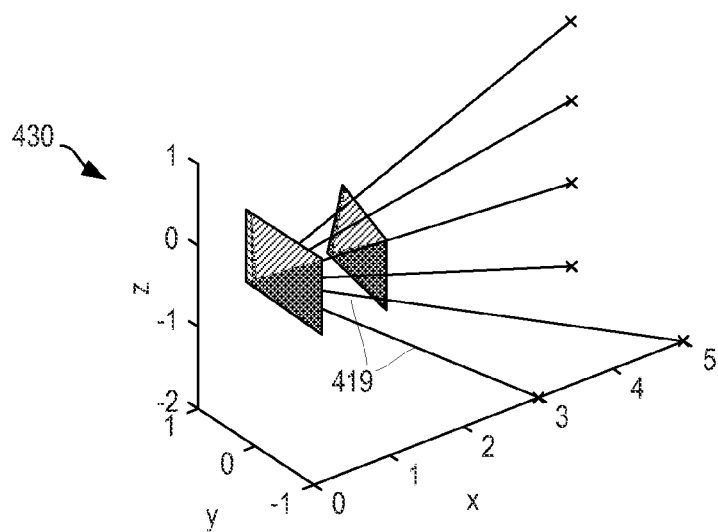

In an alternative embodiment, motion determination system 30 may determine the translation and rotation of machine 10 based on the first camera image and the second camera image, and one set of range data that corresponds to either the first camera image or the second camera image. For example, motion determination system 30 may determine the relative change in position of features within the field of view camera 32, as captured in the first camera image and the second camera image. Graph 420 in FIG. 4B shows features in the first camera image, indicated by markers 416, and features in the second camera image, indicated by markers 417. Corresponding features of the first camera image and the second camera image are connected by lines 418. Motion determination system may also obtain, for example, first range data corresponding to the first range image. First range data is represented by lines 419 in graph 430 in FIG. 4C. Motion determination system 30 may determine the translations and/or rotations of machine 10 based on the changes indicated by lines 418 and the range data indicated by lines 419.

As an example, the rotation and translation of machine 10 may be determined using the following perspective projection model:

$$\lambda x = K(RX+t) \tag{Eq. 1}$$

where: $X=(X\,Y\,Z)^T$ is the 3D position of a point; $x=(u\,v\,1)^T$ are the homogenous pixel coordinates of the point; $\lambda$ is the range of the point; K is a 3×3 camera calibration matrix; R is a 3×3 rotation matrix; and $t=(t_x\,t_y\,t_z)^T$ is the translation. The camera calibration matrix, K, accounts for intrinsic parameters of the camera, e.g., focal length of the camera lens, and can be eliminated by multiplying each side by its inverse. On the left side of Eq. 1, $x' \to K^{-1}x$, is a transformation into normalized coordinates. Below, it is assumed that all image coordinates are normalized, and thus the prime symbol is dropped for simplicity.

The coordinate system can be defined with respect to the first image, and hence the rotation is the identity and translation is zero. Given image coordinates, $x_1$, in frame 1, and known range $\lambda_1$, the 3D position of a point can be determined: $X=\lambda_1 x_1$. This position X remains unchanged in frame 2 and is projected into image coordinates $x_2$. The equation for these coordinates, $\lambda_1 x_1 = RX+t$, can be simplified as follows:

$$\lambda_2 = \begin{pmatrix} u \\ v \\ 1 \end{pmatrix} = \begin{pmatrix} r_1 \\ r_2 \\ r_3 \end{pmatrix} X + \begin{pmatrix} t_x \\ t_y \\ t_z \end{pmatrix}, \tag{Eq. 2}$$

where $r_i$ is $i^{th}$ the row of R. Eliminating the unknown depth, $\lambda_2$ yields:

$$\begin{pmatrix} u \\ v \end{pmatrix} = \frac{1}{r_3 X + t_z} \begin{pmatrix} r_1 X + t_x \\ r_2 X + t_y \end{pmatrix}. \tag{Eq. 3}$$

This equation is non-linear, but can be made linear (ignoring rotation constraints for now) by multiplying through by the denominator:

$$\begin{pmatrix} u(r_3 X + t_z) - (r_1 X + t_x) \\ v(r_3 X + t_z) - (r_2 X + t_y) \end{pmatrix} = 0. \tag{Eq. 4}$$

Rotation constraints can be incorporated by using a first order expansion of Rodriguez formula for the rotation matrix R. Let $\Omega = (\Omega_1 \Omega_2 \Omega_3)^T$ represent the axis of rotation and its magnitude the angle. Then to first order a small rotation is given by:

$$R \approx \begin{pmatrix} 1 & -\Omega_3 & \Omega_2 \\ \Omega_3 & 1 & -\Omega_1 \\ -\Omega_2 & \Omega_1 & 1 \end{pmatrix}. \tag{Eq. 5}$$

Substituting these values into the above equation and rearranging, yields:

$$\begin{pmatrix} uY & -uX-Z & Y & -1 & 0 & u \\ vY+Z & -vX & -X & 0 & -1 & v \end{pmatrix} \begin{pmatrix} \Omega \\ t \end{pmatrix} = \begin{pmatrix} X-uZ \\ Y-vZ \end{pmatrix}. \tag{Eq. 6}$$

Attempting to solve Eq. 6 for one point results in 2 equations and six unknowns. With at least 3 points, however, Eq. 6 includes sufficient equations to directly solve for the rotation and translation. A direct least squares solution will generate values for $\Omega$ and t. An exact rotation matrix R is obtained from $\Omega$ by using the full Rodriguez equation. If the actual rotation is not small, then the estimate can be refined by substituting $X \to RX$, and repeating a few times. Convergence can be rapid. By multiplying through by the denominator, an image-error cost function was changed. The image-error cost function can be approximated by weighting each point equation with 1/Z in the least squares estimate.

Based on the translations and/or rotations determined at Step 347, motion determination system 30 may determine 6 degrees of velocities of machine 10, at Step 350. For example, motion determination system may divide the translations and rotations by the elapsed time that occurred between the capture of the first camera image and the second camera image to obtain a rate of change, i.e. velocities, in the x, y, and z directions and the yaw, roll, and pitch directions. In some embodiments, motion determination system 30 may utilize more than two image frames (i.e., a third image, fourth image etc.), and average to reduce errors. Once motion determination system 30 has determined the velocities of machine 10, controller 40 may utilize the velocities to determine the position of machine 10. For example, controller 40 may integrate the velocities and add the result of the integration to a previous position to obtain a new position of machine 10. By utilizing both camera 32 and LIDAR 34, motion determination system 30 may perform an enhanced visual odometry (VO), in which the depth information provided by LIDAR 34 improves motion determination based on the camera images from camera 32. For simplicity, the combination of an image from camera 32 and an image from LIDAR 34, used to perform enhanced visual odometry, is for purposes of this disclosure referred to as a VO image. The combination of camera 32 and LIDAR 34 that is utilized to perform visual odometry as described above is, for purposes of this disclosure, referred to as the VO sensor 36 (shown in FIG. 6).

Figure 5:
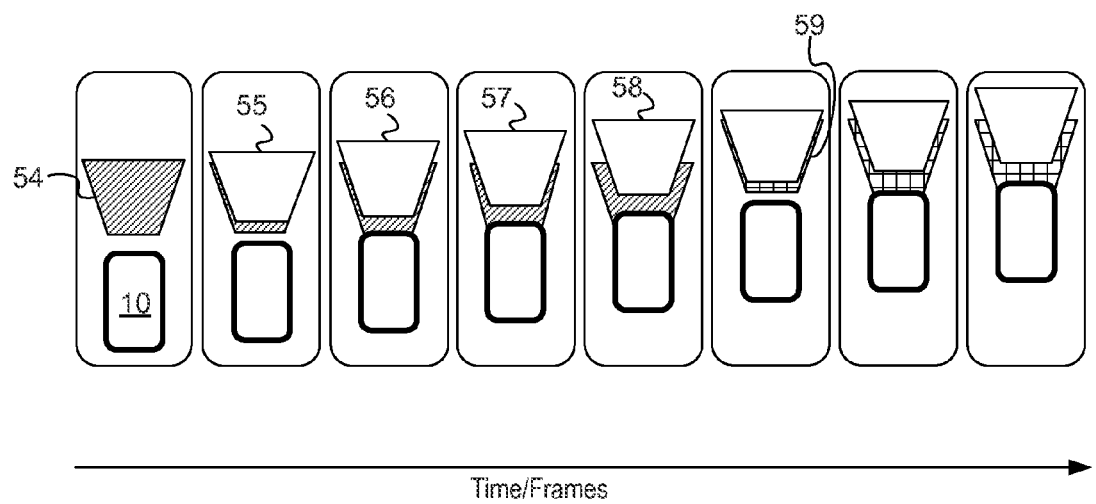
FIG. 5 is a diagrammatic illustration of an exemplary disclosed method that may be performed by the motion determination system.

In various other embodiments, motion determination system 30 may utilize key frames, as shown in FIG. 5, to determine changes in position of machine 10. For example, motion determination system 30 may utilize camera 32 and LIDAR unit 34 to obtain a VO image that corresponds to an area 54 within the field of view of camera 32. Motion determination system 30 may set this image to be a key frame image. Machine 10 may then move and accordingly change its position. Camera 32 and LIDAR unit 34 may capture a new image corresponding to an area 55 within the field of view of camera 32. Motion determination system 30 may compare the image of area 55 with the key frame image of area 54 to determine the change in position of machine 10. Machine 10 may continue to move and change positions. Camera 32 may capture new successive images corresponding to areas 56, 57, and 58. Each image may include overlap with the key frame image, and therefore, motion determination system 30 may determine the successive changes in position of machine 10 relative to the key frame image of area 54. Eventually, motion determination system 30 may need to update the key frame image if, for example, machine 10 moves such that new successive images no longer overlap with the original key frame image. In some embodiments, motion determination system 30 may set the image corresponding to area 58, which overlapped with the key frame image of area 54, to be the new key frame image 59. Subsequent successive images obtained by camera 32 and LIDAR unit 34 may then be compared with the new key frame image.

By utilizing key frame images, motion determination system 30 may utilize camera 32 and LIDAR 34 to make estimates of the position of machine 10 that are bounded in error, from key frame to key frame. This bound in error may be in contrast to determining the position of machine 10 by dead reckoning methods, in which a new position is determined based on a previous position and an integration of the motion of machine 10. For each update in position, an integration of motion is performed. Because measurements of motion usually include noise errors, this iterative integration results in an unbounded compounding of error. In various embodiments, the length of time for which dead reckoning can be performed before exceeding an acceptable threshold level of error may depend on the magnitude of noise in the measurements of change in position. However, by utilizing key frames and obtaining successive positions by comparing successive images with a common reference image, instead of integrating for each position update, motion determination system 30 may mitigate some of the error. In fact, as long as motion determination system 30 is using the same key frame, the error may be bounded by the error of the key frame.

Figure 6:
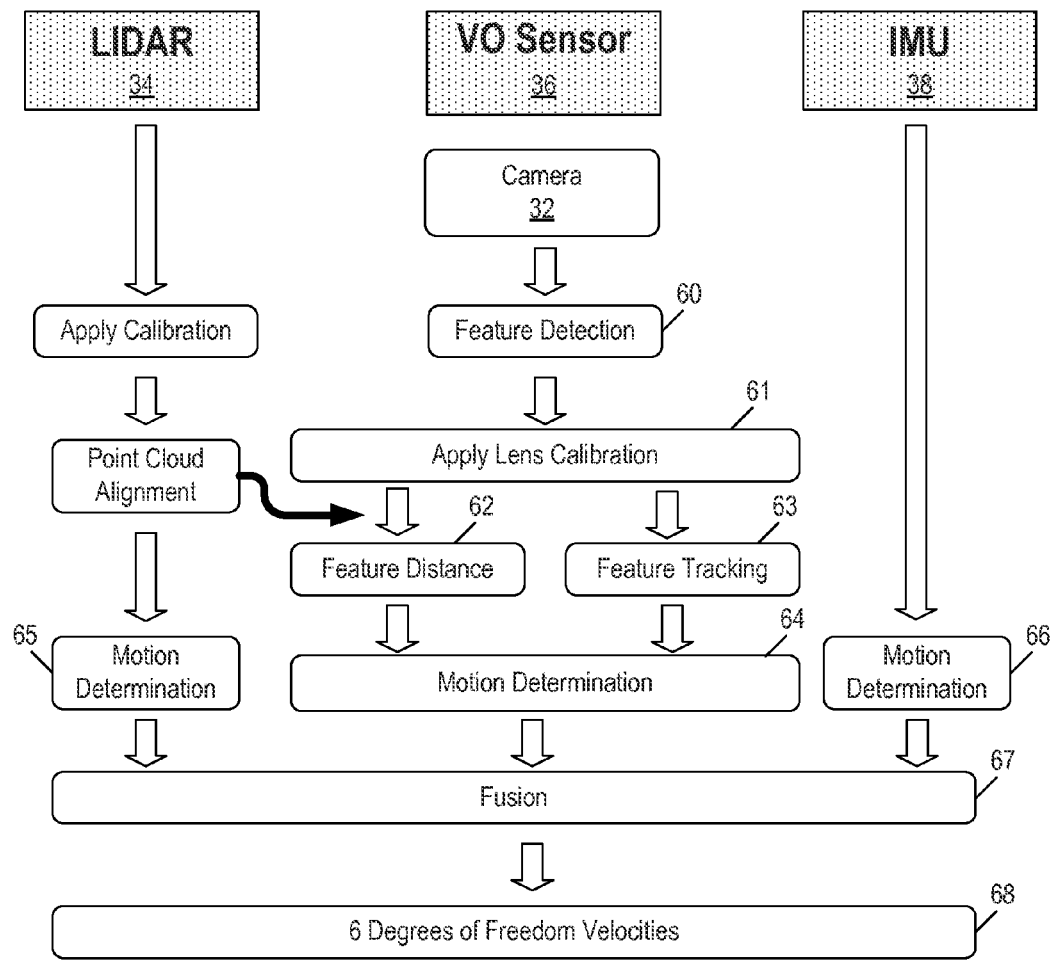
FIG. 6 is a block diagram depicting an exemplary disclosed method that may be performed by the motion determination system.

In some embodiments, motion determination system 30 may fuse data from the VO sensor 36 (which, as discussed, combines camera 32 and LIDAR 34 for visual odometry) with data from LIDAR unit 34 and IMU 38 to improve the accuracy and/or robustness of motion determination. For example, in some situations, one or more of camera 32, LIDAR 34, and IMU 38 may exhibit errors or failures based on, for example, the condition of worksite 12, device operating parameters, and device susceptibility to noise. By utilizing several sensors that provide independent information regarding the motion of machine 10, motion determination system 30 may be able to determine the motions of machine 10 by relying on the more accurate and/or more robust data, or a combination of the more accurate and/or more robust data. FIG. 6 depicts a block diagram illustrating an overview of a method for fusing inputs from the VO sensor 36, LIDAR unit 34, and IMU 38, according to one embodiment. As shown in FIG. 6, data from camera 32 of VO sensor 36 is used for feature detection 60. A lens calibration 61 may be performed, after which a feature distance 62 to the detected features may be determined by utilizing data from LIDAR unit 34. In addition, feature tracking 63 is performed as discussed above, between a first image and a second image, for example. Based on the determination of feature distance and feature tracking, a visual odometry motion determination 64 is performed. In addition, motion determination 65 may be obtained based on only data from LIDAR unit 34, and motion determination 66 may be obtained based only on IMU 38. A fusion 67 of the motion determinations 64, 65, and 66 may generate a final solution of the six degrees of freedom velocities 68 of machine 10.

Figure 7:
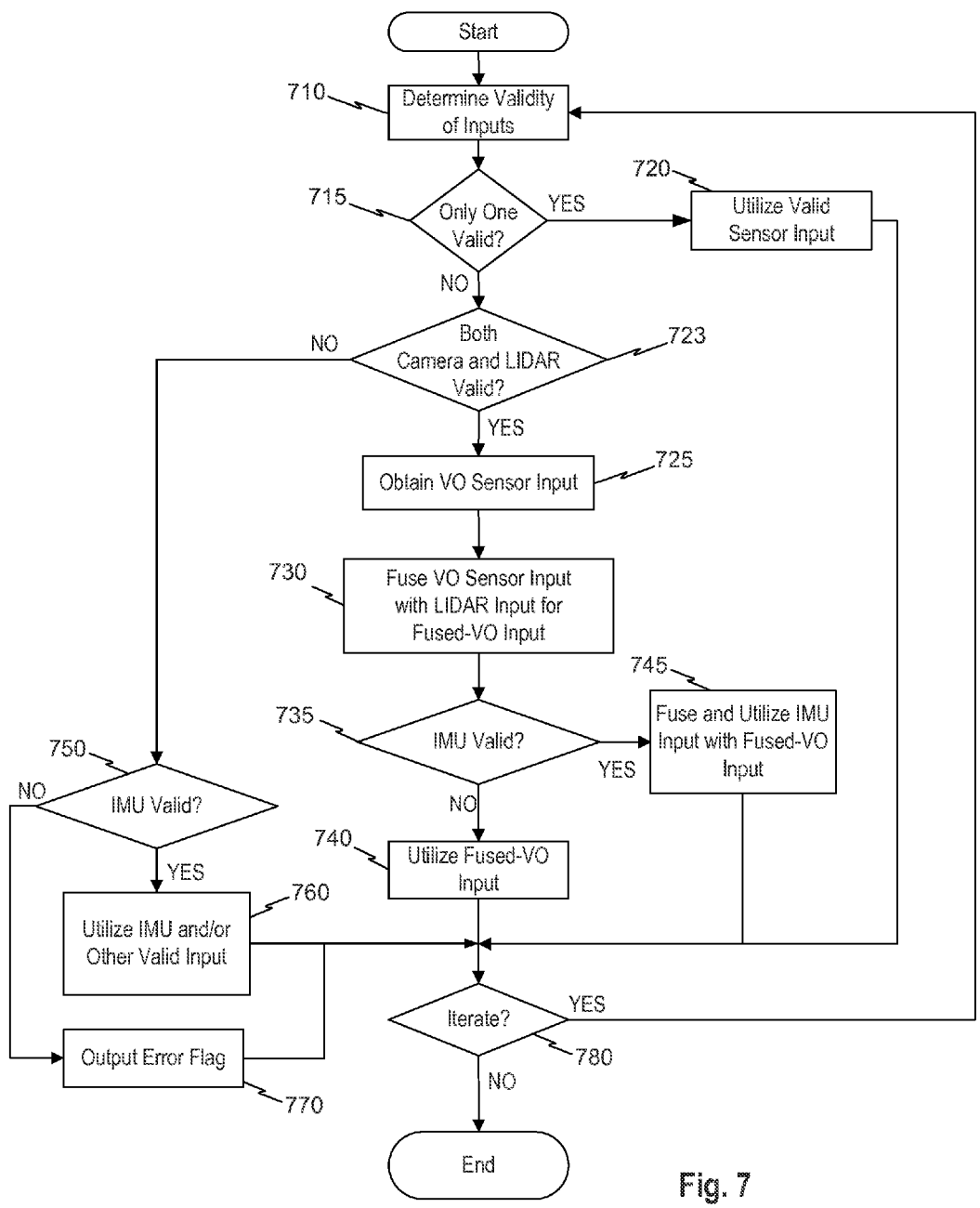
FIG. 7 is a flowchart depicting another exemplary disclosed method that may be performed by the motion determination system.

FIG. 7 depicts a flowchart showing an exemplary method for fusing inputs from camera 32, LIDAR unit 34, and IMU 38 to determine the motion of machine 10. At Step 710, motion determination system 30 may determine an initial validity of signal inputs from sensor devices including camera 32, LIDAR unit 34, and IMU 38. In some embodiments, these sensor devices may include internal error checks which output an error flag to motion determination system 30 when an internal and/or operational malfunction in the device is occurring. For example, a device may output a measure of uncertainty based on various operational parameters, such as the speed of machine 10 and/or the number of measurement points obtained, by utilizing a known noise model associated with each device. If the uncertainty level is above a predetermined threshold, motion determination system 30 may determine that the device is providing, at least momentarily, an invalid input. In some other embodiments, one or more inputs may be invalid while another is valid because one sensor has a faster data rate than the other. For example, IMU 38 may have a faster data rate than camera 32 and LIDAR unit 34. In such situations, the faster sensor may be valid while the slow sensor may still be obtaining its data.

If, at Step 715, motion determination system 30 determines that an input from only one of camera 32, LIDAR unit 34, and IMU 38 is valid (Step 715: YES), motion determination system 30 may utilize the valid sensor input to determine the motion of machine 10 (Step 720). In some embodiments that utilize only camera 32, e.g. when LIDAR unit 34 and IMU 38 are determined invalid at Step 710, camera 32 may capture a first camera image and a second camera image at successive points in time. Motion determination system 30 may identify corresponding features in the first camera image and the second camera image. Based on the assumption that the terrain is flat, motion determination system 30 may estimate the changes in position of the corresponding features relative to machine 10 from the first camera image and the second camera image. Motion determination system 30 may then determine translational and rotational velocities of machine 10 based on the changes in position of the corresponding features, and the time elapsed between the capture of the first camera image and the second camera image. For example, motion determination system 30 may divide the change in positions by the elapsed time. In some embodiments, if camera 32 is a single camera, utilizing camera 32 without LIDAR unit 34 for motion determination may be suitable when machine is traversing flat terrain.

In some other embodiments that utilize only LIDAR unit 34, e.g., when camera 32 and IMU 38 are determined invalid at Step 710, when camera LIDAR unit 34 may obtain first range data and second range data at successive points in time. Each range data may represent a point cloud image of the portion of worksite 12 surrounding machine 10. Based on the change in the first range data and the second range data, motion determination system 30 may determine translational and rotational changes in position of machine 10. Motion determination system 30 may then determine the translational and rotational velocities of machine 10, for example, by dividing the translational and rotational changes by the time elapsed between capture of first range data and second range data. In some embodiments, utilizing LIDAR unit 34 without camera 32 for motion determination may be suitable when machine 10 is traversing terrain that is not flat.

In some other embodiments that utilize only IMU 38, e.g., when camera 32 and LIDAR unit 34 are determined invalid at Step 710, motion determination system 30 may receive the acceleration of machine 10 in the x-, y-, and z-directions and the yaw, pitch, and roll directions. Motion determination system 30 may integrate the acceleration for change in velocity, and then integrate the velocity for change in position. Motion determination system 30 may add the change in position to a previously determined position, to obtain the current position of machine 10. IMU 38 may be suitable for use in flat terrain or varying terrain. In some embodiments, IMU 38 may provide robust measurements of acceleration and velocity, but may include angular random walk, bias offset, and bias drift errors.

If motion determination system 30 determines that more than one of inputs from camera 32, LIDAR unit 34, and IMU 38 is valid (Step 715: NO), then the process may proceed to Step 723. At Step 723, motion determination system 30 may determine whether both camera 32 and LIDAR unit 34 are valid. If both camera 32 and LIDAR unit 34 are valid (Step 723: YES), VO sensor 36 may be utilized for motion determination, since both inputs are available. Therefore, at Step 725, motion determination system 30 may obtain VO sensor input (as described with respect to FIG. 3). At Step 730, motion determination system 30 may fuse VO sensor 36 input with LIDAR unit 34 input for a fused-VO input. For example, motion determination system 30 may fuse motion determination based on VO sensor 36, obtained at Step 725, with motion determination based only on LIDAR unit 34, as described with respect to Step 720 for when LIDAR unit 34 is the only valid input. For purposes of this disclosure, the result of fusing motion determination inputs from VO sensor 36 and LIDAR unit 34 is referred to as fused-VO motion determination or input.

Motion determination system 30 may fuse the inputs from VO sensor 36 and LIDAR 34 based on various criteria. For example, in some embodiments, VO sensor 36 may provide high resolution images at a high frame rate as compared with LIDAR unit 34. On the other hand, LIDAR unit 34 may provide range data covering a wider field of view (up to 360 degrees), thereby making LIDAR unit 34 a more robust sensor. Based on various situations, VO sensor 36 or LIDAR unit 34 may provide a more accurate or reliable measurement. Each sensor device may output a measure of uncertainty based on the conditions of measurement and the noise model associated with each device. Motion determination system 30 may take a weighted average of the inputs from VO sensor 36 and LIDAR unit 34 based on these uncertainty measures.

In one example, because LIDAR unit 34 may have a wider field of view, motion determination system 30 may utilize LIDAR unit 34 to detect environmental motion in the scene. Environmental motion may be due to a portion of worksite 12 that is not stationary with respect to machine 10, even though machine 10 is not moving. For example, environmental motion may be associated with another mobile machine on worksite 12. Such a machine may traverse in front of camera 32 and take up its entire field of view, skewing the data from VO sensor 36. If utilizing camera-based visual odometry without any additional information, motion determination system 30 may determine that machine 10 is moving from the left to the right due to the fact that successive camera images are shifting from the right to left, for example. However, this determination would be incorrect, as the shift in images is in fact due to the other machine moving in front of machine 10, from the right to the left. Motion determination system 30 may recognize the actual situation based on information from LIDAR unit 34. Because LIDAR unit 34 may have a wider field of view, LIDAR unit 34 may be able to detect the approach of another machine towards machine 10 before it enters the field of view of VO sensor 36. As a result, motion determination system 30 may be able to flag the movement of the other machine in images captured by VO sensor 36, based on the information obtained by LIDAR unit 34. During periods in which environmental motion is occurring in the field of view of VO sensor 36, input from VO sensor 36 may be associated with a higher uncertainty measure than the input from LIDAR unit 34. During other periods, because VO sensor 36 provides higher resolution and higher frame rates for a narrower field of view, input from VO sensor 36 may be associated with a lower uncertainty measure than the input from LIDAR unit 34. Motion determination system 30 may determine a motion of machine 10 by calculating a weighted average of the velocity determined from LIDAR 34 and from VO sensor 36, with the measurement associated with less uncertainty being weighted more. In some embodiments, the properties of VO sensor 36 and LIDAR unit 34 may be switched. VO sensor 36 may have a wider field of view while LIDAR unit 34 may be capable of higher resolution and higher frame rates for a smaller field of view, for example.

In some situations, the resulting fused-VO input, obtained at Step 730, may be based only on input from VO sensor 36, only on input from LIDAR unit 34, or on both. For example, fused-VO input may be based only on VO sensor 36 when the uncertainty of LIDAR unit 34 is larger than an acceptable threshold and VO sensor 36 is within the range of acceptable threshold. Such a situation may occur when, for example, machine 10 is traversing flat terrain. LIDAR unit 34 may be able to detect changes in pitch and roll, but unable to detect changes in yaw (heading) and translation in the x-, y-, and z-directions without high uncertainty since the contour in these directions is uniform. Therefore, the uncertainty measure associated with LIDAR unit 34 (at least for yaw, x-, y-, and z-directions) may be larger than an acceptable threshold measure. In contrast, VO sensor 36 may be able to detect changes in all six degrees of freedom, due to changes in color of the terrain, for example. VO sensor 36 may utilize range information to various different colors of the terrain, from LIDAR unit 34, to generate more accurate motion determination than if without the range information. In another example, fused-VO input may be based only on input from LIDAR unit 34 when the uncertainty of VO sensor 36 is larger than an acceptable threshold. Such a situation may occur when, for example, environmental motion crosses the field of view of camera 32. In another example, fused-VO input may be based on both inputs from VO sensor 36 and LIDAR unit 34 when uncertainty measures for both inputs are within an acceptable threshold.

In some other embodiments, motion determination system 30 may fuse inputs from VO sensor 36 and LIDAR 34 by using a mathematical prediction filter, such as a Kalman filter. Motion determination system 30 may utilize the input from the less robust sensor device with the faster frame rate, e.g., VO sensor 36, in the propagation phase of the Kalman filter, and from the slower, more robust sensor, e.g., LIDAR unit 34, for the update phase. For example, motion determination system 30 may predict the velocities of machine 10 based on measurements from VO sensor 36 in the propagation stage, and update the velocities of machine 10 based on measurement from LIDAR unit 34 in the update stage.

At Step 735, motion determination system 30 may determine whether the input from IMU 38 is valid. If IMU 38 is invalid (Step 735: NO), motion determination system 30 may utilize the fused-VO input as obtained in Step 730 to determine the motion of machine 10 (Step 740). If the input from IMU 38 is valid (Step 735: YES), motion determination system 30 may, at Step 745, fuse and utilize input from IMU 38 with the fused-VO input obtained in Step 730. For purposes of this disclosure, the result of fusing input from IMU 38 and fused-VO input can be referred to as a fused-VO-IMU measurement. Step 745 is described in further detail with reference to FIG. 8, which shows an exemplary flowchart for fusing inputs from IMU 38 with fused-VO input.

Figure 8:
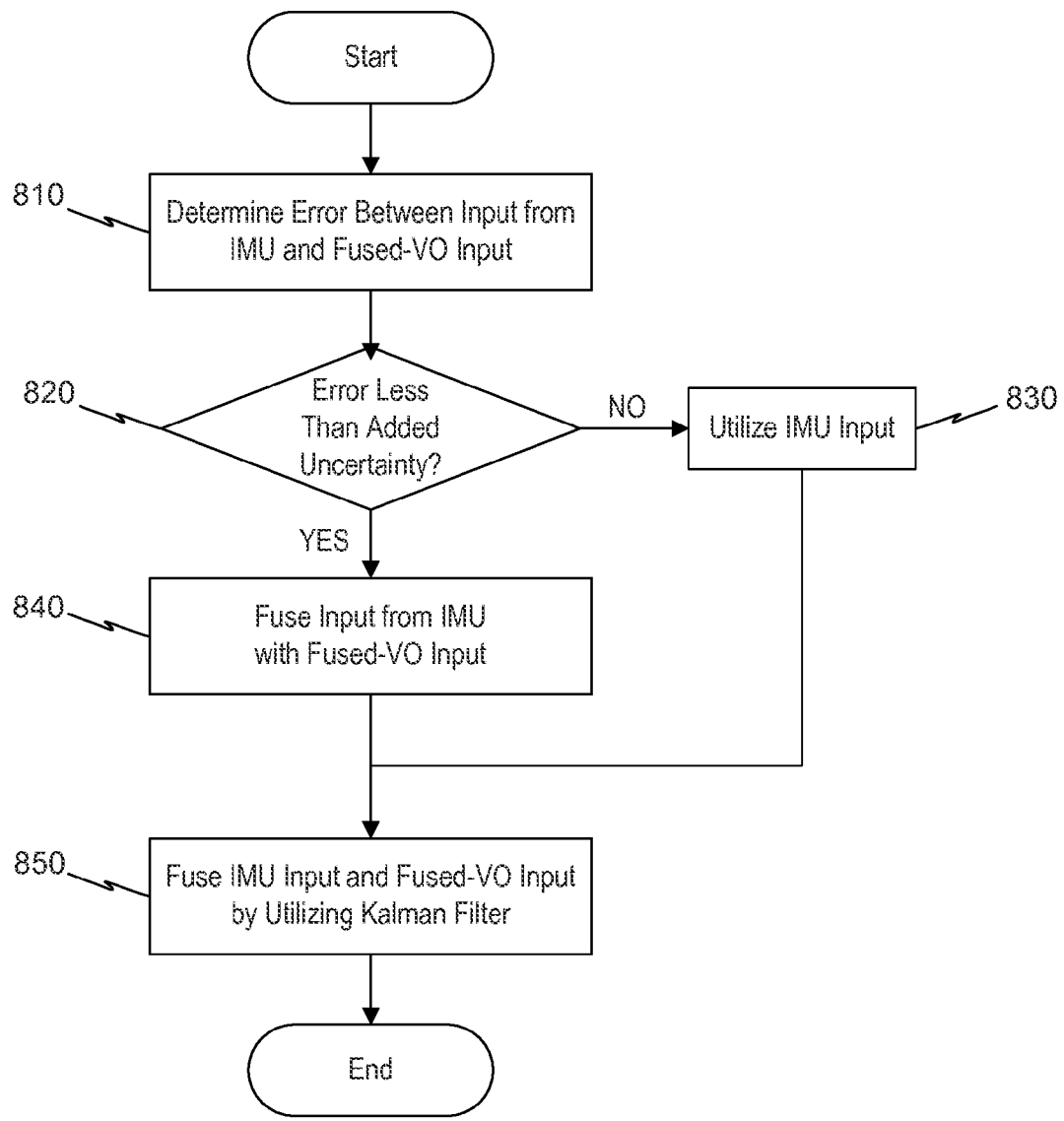
FIG. 8 is a flowchart depicting a further exemplary disclosed method that may be performed by the motion determination system.

At Step 810, in FIG. 8, motion determination system 30 may determine the error between the input from IMU 38 and the fused-VO input. At Step 820, motion determination system 30 may check whether the error is less than the added uncertainty measures associated with input from IMU 38 and the fused-VO input. For the fused-VO input, the uncertainty measure may be the larger of the uncertainty measures associated with the VO sensor 36 and LIDAR 34 that are fused together. If the error determined at Step 810 is more than the sum of uncertainty measures (Step 820: NO), motion determination system 30 may use the input from IMU 38, at Step 830. Motion determination system 30 may use IMU 38 based on an assumption that IMU is more likely to be correct. This assumption may be based on the fact that the fused-VO input may be erroneously skewed by an environmental motion filling the entire field of view of camera 32 and/or LIDAR unit 34. Otherwise, if the error is less than the added uncertainties (Step 820: YES), motion determination system 30 may fuse the input from IMU 38 with the fused-VO input (Step 840). Motion determination system 30 may fuse the inputs by taking a weighted average of the inputs based on the uncertainty measured associated with each input.

In some other embodiments, at Step 850, motion determination system 30 may fuse various inputs from IMU 38 and the fused-VO input, by using a Kalman filter. For example, motion determination system 30 may fuse measured inputs with derivative inputs. FIG. 9 depicts table 900 of exemplary measured inputs and derivative inputs that can be obtained from IMU 38 and the fusion of VO sensor 36 and LIDAR unit 34 (labeled "Visual Odometry" in table 900). Derivative inputs may be inputs that are derived from measurements by integrating once (I1), integrating twice (I2), or taking a derivative once (D1). For example, table 900 shows that IMU 38 may generate measurement inputs of angular position for roll and pitch angles, angular velocity for roll, pitch, and yaw rates, and linear acceleration in the x-, y-, and z-directions. From these measurement inputs, IMU 38 may provide derived inputs of the roll, pitch, and heading angles, linear velocities, and linear positions, by integrating various measurement inputs once or twice. Likewise, measurement inputs and derived inputs are obtained from visual odometry (which may be fused-VO input when both are valid, or input from VO sensor 36 or LIDAR unit 34 when only one is valid). With visual odometry, the angular velocities and the linear velocities of machine 10 may be directly measured. From these measurement inputs, roll, pitch, and heading angular positions, linear positions in x-, y-, and z-directions, and linear accelerations may be derived by integration. Visual odometry also provides another type of measurement via use of key frames, as described above. Such measurements are indicated as "relative" measurement in Table 900, and are relative to the key frames. For example, visual odometry may provide an angular position or a position of machine 10 after it has moved relative to a key frame.

Motion determination system 30 may utilize the derived inputs in the propagation phase of the Kalman filter to estimate the angular position and/or linear position of machine 10. However, the estimated uncertainty measure of the final solution may grow unbounded, with each propagation and estimation of the angular position and/or linear position of machine 10. Therefore, motion determination system 30 may utilize measurement inputs in the measurement update phase of the Kalman filter. The estimated uncertainty measure of the final solution becomes bounded to the measurement error. In some embodiments, when the measurement input being used is based on key frames, motion determination system 30 may add an additional measurement uncertainty associated with the key frame, at the time a key frame is updated. This uncertainty is due to the key frames themselves not being referenced against an absolute measure of position.

As an example of the method based on the table in FIG. 9, motion determination system 30 may receive derived inputs of angular position from both IMU 38 and visual odometry. Both angular position from IMU 38 and angular position from visual odometry are derived by integrating once the direct measurement of angular velocity. Motion determination system 30 may check to see whether the error between the two derived inputs is less than the sum of their uncertainty measures. If the error is not less than the sum, motion determination system 30 may use the angular position as derived by IMU 38 in the propagation phase of a Kalman filter. If the error is less than the sum, motion determination system 30 may fuse the angular position obtained from IMU 38 and from visual odometry, for example by taking a weighted average of the two inputs based on the associated uncertainty measures for the inputs. Motion determination system 30 may then use the fused angular position in the propagation phase of a Kalman filter. For the measurement update phase of the Kalman filter, motion determination system 30 may use the static measurement input of angular position as provided by IMU 38, if machine 10 is static. If machine 10 is moving, motion determination system 30 may use the dynamic measure of change in angular position, relative to the key frame, as measured by visual odometry, for the measurement update phase of the Kalman filter.

In another example, motion determination system 30 may fuse derived positions from IMU 38 and from visual odometry, for example, by taking a weighted average. The derived position from IMU 38 may come from integrating twice the measured linear acceleration, and the derived position from the visual odometry may come from integrating once from the measured linear velocity. Motion determination system 30 may utilize the fused position in the propagation stage of a Kalman filter, and then utilize the position measured relative to the key frame in visual odometry in the measurement update step of the Kalman filter. By using key frames, the uncertainty in the final solution is bounded by the uncertainty measure of the key frame, until the next key frame is utilized.

With continued reference back to FIG. 7, motion determination system 30 may determine that the inputs from VO sensor 36 and LIDAR unit 34 are not valid (Step 723: NO). That is, only one of camera 32 and LIDAR unit 34 may be valid. For example, camera 32 may be valid for certain motion determinations even though LIDAR 34 is not valid. At Step 750, motion determination system 30 may check whether IMU 38 is valid. If IMU 38 is valid (Step 750: YES), motion determination system 30 may utilize IMU 38 and/or the other valid input, e.g., camera 32 or LIDAR unit 34, to make a motion determination, at Step 760. For example, motion determination system 30 may output motion determination based on the input with the lower uncertainty measure or may output an average that is weighted based on the uncertainty measures associated with each input. In one example, motion determination system 30 may output the measurement by IMU 38 as the default, unless an error between the measurement by IMU 38 and by the other valid device is smaller than a threshold. If the error between the measurements is smaller than the threshold, motion determination system 30 may output a weighted average of the measurements. If IMU 38 is invalid (Step 750: NO), motion determination system 30 may determine that none of the inputs, from IMU 38, camera 32, and LIDAR unit 34, are valid. Motion determination system 30 may therefore output an error flag, at Step 770.

At step 780, motion determination system 30 may determine whether to iterate the steps described above. For example, motion determination system may iterate the above steps, (Step 780: YES), as long as machine 10 is in operation. Motion determination system 30 may receive new inputs from camera 32, LIDAR unit 34, and/or IMU 38 that reflect updated motions of machine 10. Otherwise, (Step 780: NO), motion determination system 30 may choose to stop iterating and end motion determination. For example, motion determination system 30 may cease determining the motion of machine 10 when machine 10 is turned off or when an operator of machine 10 inputs a command to stop motion determination.

Figure 10:
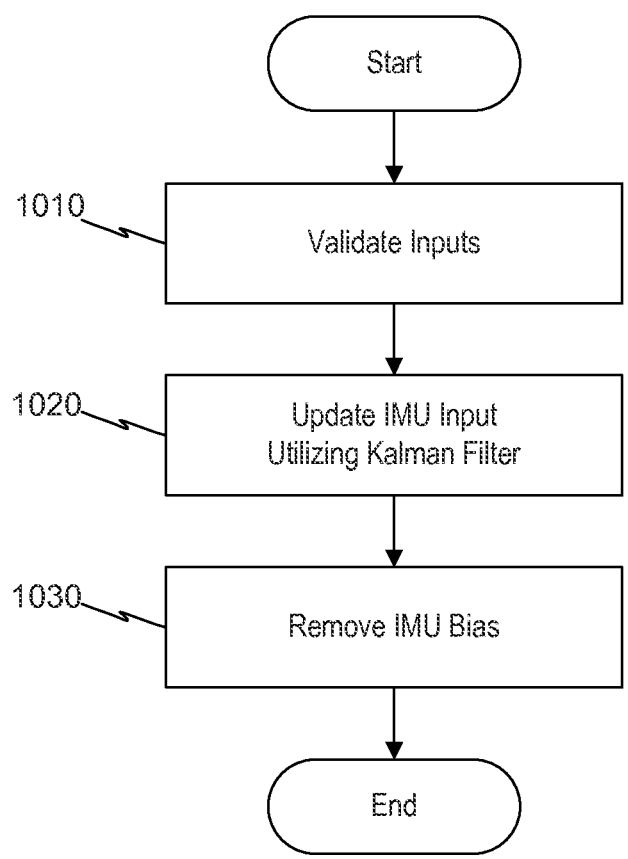
FIG. 10 is a flowchart depicting yet another exemplary disclosed method that may be performed by the motion determination system.

According to exemplary methods described with respect to FIG. 7, motion determination system may fuse various inputs from camera 32, LIDAR unit 34, and IMU 38 to provide a robust determination of motion of machine 10. In a further embodiment, motion determination system 30 may fuse measurements from IMU 38 with relative measurements from visual odometry, i.e. measurements based on key frames, to correct the biases of IMU 38. For example, IMU 38 may be capable of directly measuring the pitch and roll of machine 10 under static conditions. Under static conditions, motion determination system 30 may determine offset biases in pitch and roll, and correct for them. However, IMU 38 may not have a way to directly measure heading (yaw angle) or linear position, and correct for biases. FIG. 10 depicts a flowchart showing an exemplary method for correcting such IMU biases using visual odometry. At Step 1010, motion determination system 30 may validate the inputs from IMU 38, camera 32, and LIDAR unit 34. At Step 1020, if IMU 38, camera 32, and LIDAR unit 34 are valid, motion determination system 30 may update the IMU input by utilizing a Kalman filter. For example, the heading or position of machine 10 as derived by IMU 38 (by integrating angular velocity once or integrating acceleration twice) may be used in the propagation phase of the Kalman filter. The measurement of heading or position relative to a key frame based on visual odometry, i.e. fused-VO input, may be used in the measurement update phase of the Kalman filter. The final solution of the Kalman filter will produce a heading or position of machine 10, as well as provide a correction term for the bias of IMU 38. At Step 1030, motion determination device may remove IMU bias based on the correction term.

It will be apparent to those skilled in the art that various modifications and variations can be made to the disclosed motion determination system. Other embodiments will be apparent to those skilled in the art from consideration of the specification and practice of the disclosed motion determination system. For example, the steps described need not be performed in the same sequence discussed or with the same degree of separation. Likewise, various steps may be omitted, repeated, or combined. It is intended that the specification and examples be considered as exemplary only, with a true scope being indicated by the following claims and their equivalents.

What is claimed is:

1. A motion determination system for determining motion of a machine, the system comprising:
   one or more memories storing instructions; and
   one or more processors configured to execute the instructions to perform operations, including:
      receiving a first camera image and a second camera image from a camera affixed to the machine, wherein the first camera image is received earlier in time than the second camera image;
      identifying corresponding features in the first camera image and the second camera image;
      receiving range data, wherein the range data comprises at least one of a first range data and a second range data from a range detection unit affixed to the machine, and the first range data and the second range data correspond to the first camera image and the second camera image, respectively;
      determining first positions of the corresponding features using the first camera image and determining second positions of the corresponding features using the second camera image, wherein the first positions or the second positions are determined by also using the range data;
      determining a change in position of the machine based on differences between the first positions and the second positions; and
      determining a VO-based velocity of the machine based on the determined change in position of the machine,
   wherein the range data comprises the first range data and the second range data, and the one or more processors are further configured to execute the instructions to perform:

determining a range-based velocity of the machine based on changes between the first range data and the second range data; and fusing the range-based velocity with the VO-based velocity to generate a fused-VO velocity.

2. The system of claim 1, wherein:

the range data includes the first range data and the second range data;

the first positions are determined based on both the first camera image and the first range data; and the second positions are determined based on both the second camera image and the second range data.

3. The system of claim 1, wherein the one or more processors are further configured to execute the instructions to perform:

generate the fused-VO velocity based on a weighted average of the range-based velocity and the VO-based velocity, wherein the weighted average is based on uncertainty measures for the range-based velocity and the VO-based velocity.

4. The system of claim 1, wherein the one or more processors are further configured to execute the instructions to perform:

generate the fused-VO velocity based on an output of a Kalman filter, by:

utilizing the VO-based velocity in a propagation stage of the Kalman filter, and utilizing the range-based velocity in a measurement update stage of the Kalman filter.

5. The system of claim 1, wherein the one or more processors are further configured to execute the instructions to perform:

fusing the range-based velocity and the VO-based velocity based on both velocities being valid, wherein the velocities are valid when associated uncertainty measures are below a predetermined threshold.

6. The system of claim 1, wherein the one or more processors are further configured to execute the instructions to perform:

receiving one or more IMU measurement from an IMU affixed to the machine;

determining one or more IMU-derived measurements derived from one or more IMU measurements; and fusing at least one of the IMU measurements or at least one of the IMU-derived measurements with either the fused-VO velocity or a measurement derived from the fused-VO velocity to generate a fused-VO-IMU measurement.

7. The system of claim 6, wherein the one or more processors are further configured to execute the instructions to perform:

generating the fused-VO-IMU measurement based on a weighted average, wherein the weighted average is determined based on an uncertainty measure for each measurement that is being fused.

8. The system of 6, wherein:

the fusion to generate a fused-VO-IMU measurement occurs when each measurement that is being fused is valid, wherein each measurement is valid when associated uncertainty measures are below a predetermined threshold.

9. The system of claim 6, wherein the one or more processors are further configured to execute the instructions to perform:

fusing one or more derived measurements with one or more direct measurements to output the position of the machine using a Kalman filter, wherein one or more derived measurements comprises the fused-VO-IMU measurement, one or more direct measurements comprises an IMU measurement, the fused-VO velocity, or a relative measurement based on a key frame image obtained by at least one of the camera and the range detection device, the one or more derived measurements are used in a propagation phase of the Kalman filter, and the one or more direct measurements are used in a measurement update phase of the Kalman filter.

10. The system of claim 1, wherein the one or more processors are further configured to execute the instructions to perform:

correcting an IMU bias by utilizing a Kalman filter, wherein an IMU-derived measurement derived from an IMU measurement is utilized in a propagation phase of the Kalman filter, and a relative measurement based on a key frame image obtained by at least one of the camera and the range detection device is utilized in a measurement update phase of the Kalman filter.

11. A computer-implemented method for determining motion of a machine, the method comprising:

receiving, by one or more computer processors, a first camera image and a second camera image from a camera affixed to the machine, wherein the first camera image is received earlier in time than the second camera image;

identifying, by the one or more computer processors, corresponding features in the first camera image and the second camera image;

receiving, by the one or more computer processors, range data, wherein the range data comprises a first range data and a second range data from a range detection unit affixed to the machine, and the first range data and the second range data correspond to the first camera image and the second camera image, respectively;

determining first positions of the corresponding features using the first camera image and determining second positions of the corresponding features using the second camera image, wherein the first positions or the second positions are determined by also using the range data;

determining, by the one or more computer processors, a change in position of the machine based on differences between the first positions and the second positions; and determining, by the one or more computer processors, a VO-based velocity of the machine based on the determined change in position of the machine;

wherein the range data comprises the first range data and the second range data, further including:

determining a range-based velocity of the machine based on changes between the first range data and the second range data; and fusing the range-based velocity with the VO-based velocity to generate a fused-VO velocity, wherein the fused-VO velocity is generated based on a weighted average of the range-based velocity and the VO-based velocity, and the weighted average is based on uncertainty measures for the range-based velocity and the VO-based velocity, or the fused-VO velocity is generated based on an output of a Kalman filter, by:

utilizing the VO-based velocity in a propagation stage of the Kalman filter, and utilizing the range-based velocity in a measurement update stage of the Kalman filter.

12. The method of claim 11, wherein:
the range data includes the first range data and the second range data;
the first positions are determined based on both the first camera image and the first range data; and
the second positions are determined based on both the second camera image and the second range data.

13. The method of claim 11, further including:
receiving one or more IMU measurement from an IMU affixed to the machine;
determining one or more IMU-derived measurements derived from one or more IMU measurements; and
fusing at least one of the IMU measurements or at least one of the IMU-derived measurements with either the fused-VO velocity or a measurement derived from the fused-VO velocity to generate a fused-VO-IMU measurement, wherein
the fused-VO-IMU measurement is based on a weighted average, wherein the weighted average is determined based on an uncertainty measure for each measurement that is being fused.

14. The method of claim 13, further including:
fusing one or more derived measurements with one or more direct measurements to output the position of the machine using a Kalman filter, wherein
one or more derived measurements comprises the fused-VO-IMU measurement,
one or more direct measurements comprises an IMU measurement, the fused-VO velocity, or a relative measurement based on a key frame image obtained by at least one of the camera and the range detection device,
the one or more derived measurements are used in a propagation phase of the Kalman filter, and
the one or more direct measurements are used in a measurement update phase of the Kalman filter.

15. The method of claim 11, further including:
correcting an IMU bias utilizing a Kalman filter,
wherein an IMU-derived measurement derived from an IMU measurement is utilized in a propagation phase of the Kalman filter, and
a relative measurement based on a key frame image obtained by at least one of the camera and the range detection device is utilized in a measurement update phase of the Kalman filter.

16. The method of claim 11, wherein:
the range-based velocity and the VO-based velocity are fused based on both velocities being valid, wherein the velocities are valid when associated uncertainty measures are below a predetermined threshold.

17. The method of claim 13, wherein:
the fusion to generate the fused-VO-IMU measurement occurs when each measurement that is being fused is valid, wherein each measurement is valid when associated uncertainty measures are below a predetermined threshold.

18. A machine, comprising:
a camera affixed to the machine;
a range detection unit affixed to the machine; and
a controller in communication with the camera and the range detection unit, configured to:
receive a first camera image and a second camera image from the camera, wherein the first camera image is received earlier in time than the second camera image;
identify corresponding features in the first camera image and the second camera image;
receive range data, wherein the range data comprises at least one of a first range data and a second range data from the range detection unit, and the first range data and the second range data corresponding to the first camera image and the second camera image, respectively,
determine first positions of the corresponding features using the first camera image and determine second positions of the corresponding features using the second camera image, wherein the first positions or the second positions are determined by also using the range data;
determine a change in position of the machine based on differences between the first positions and the second positions;
determine a VO-based velocity of the machine based on the determined change in position of the machine;
wherein the range data comprises the first range data and the second range data, and the controller is further configured to:
determine a range-based velocity of the machine based on differences between the first range data and the second range data; and
fuse the range-based velocity with the VO-based velocity to generate a fused-VO velocity, wherein
the fused-VO velocity is generated based on a weighted average of the range-based velocity and the VO-based velocity, wherein the weighted average is determined based on uncertainty measures for the range-based velocity and the VO-based velocity, or
the fused-VO velocity is generated based on an output of a Kalman filter, by:
utilizing the VO-based velocity in a propagation stage of the Kalman filter, and
utilizing the range-based velocity in a measurement update stage of the Kalman filter.

19. The machine of claim 18, wherein:
the range data includes the first range data and the second range data;
the first positions are determined based on both the first camera image and the first range data; and
the second positions are determined based on both the second camera image and the second range data.

20. The machine of claim 18, wherein the controller is further configured to:
receive one or more IMU measurement from an IMU affixed to the machine;
determine one or more IMU-derived measurement derived from one or more IMU measurements; and
fuse an IMU measurement or an IMU-derived measurement with either the fused-VO velocity or a measurement derived from the fused-VO velocity to generate a fused-VO-IMU measurement, wherein
the fused-VO-IMU measurement is generated based on a weighted average, and the weighted average is determined based on an uncertainty measure for each measurement that is being fused.

* * * * *